United States Patent [19]
Cunningham et al.

[11] Patent Number: 5,060,121
[45] Date of Patent: Oct. 22, 1991

[54] SEALED TAIL LIGHT FOR A BOAT TRAILER

[75] Inventors: Alton J. Cunningham, Slinger; Brian A. Hanson, Theresa, both of Wis.

[73] Assignee: Wesbar Corporation, West Bend, Wis.

[21] Appl. No.: 557,977

[22] Filed: Jul. 26, 1990

[51] Int. Cl.$^5$ ............................................. B60Q 1/56
[52] U.S. Cl. ..................... 362/61; 362/83.2; 362/267
[58] Field of Search ................ 362/61, 267, 285, 310, 362/332, 368, 83.2, 375

[56] References Cited

U.S. PATENT DOCUMENTS

| | | | |
|---|---|---|---|
| 2,102,029 | 12/1937 | Putterman | 362/375 |
| 3,032,646 | 5/1962 | Chieger . | |
| 3,106,349 | 10/1963 | Bloodgood, Jr. . | |
| 3,858,039 | 12/1974 | Moore . | |
| 4,281,367 | 7/1981 | Moore et al. | 362/96 |
| 4,293,847 | 10/1981 | McCarty | 362/267 X |
| 4,506,314 | 3/1985 | Moore | 362/267 |
| 4,617,617 | 10/1986 | Cunningham et al. | 362/267 |

Primary Examiner—Stephen F. Husar
Attorney, Agent, or Firm—Andrus, Sceales, Starke & Sawall

[57] ABSTRACT

A sealed tail light assembly for a boat trailer including an outer housing and a sealed capsule is contained within the housing. The capsule is composed of a base and a transparent casing that contains a pair of light bulbs. The base is provided with a depression or well. Electrical conductors are connected to the bulbs and extend through openings in the base into the well where the ends of the conductors are connected to electrical leads. The well is filled with an electrically insulating material, such as resin, which encloses the openings in the well and encapsulates the connections between the conductors and the leads. One end of the capsule is provided with a tongue, which is received within a slot in the rear wall of the housing, while the opposite end of the capsule is formed with a lip which is captured between the lower edge of the side marker lens and the rear wall, thus enabling the capsule to be secured within the housing without the need for auxiliary connectors.

28 Claims, 3 Drawing Sheets

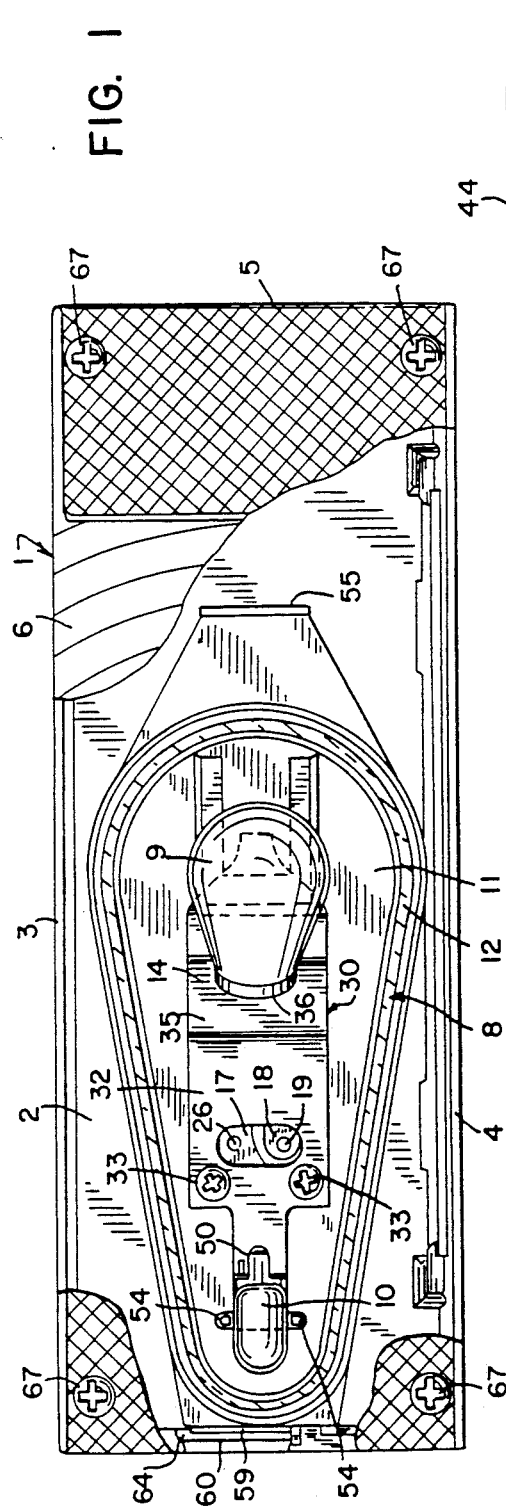
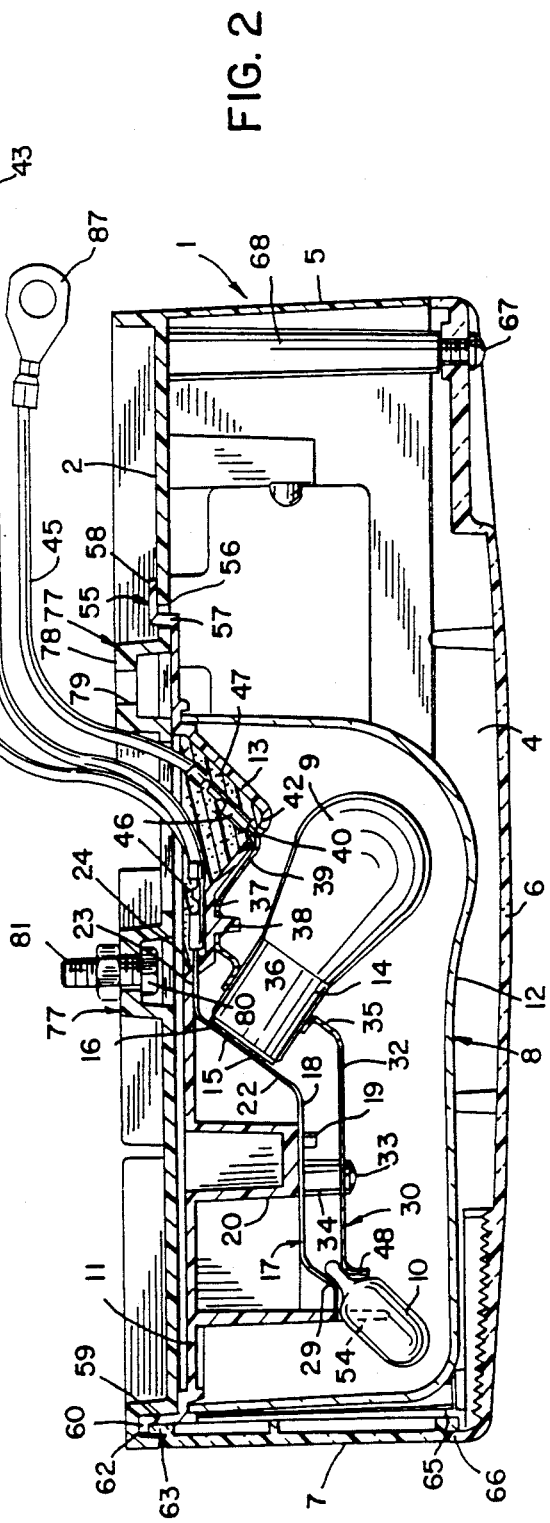

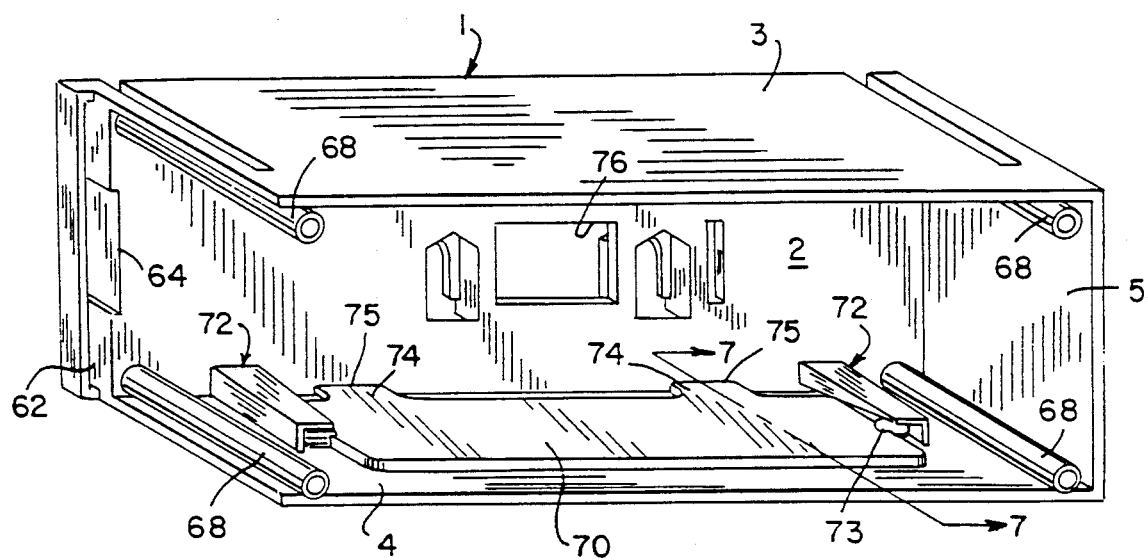
FIG. 6
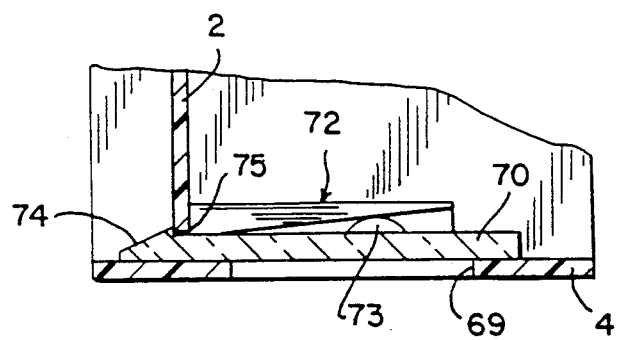
FIG. 7
FIG. 8
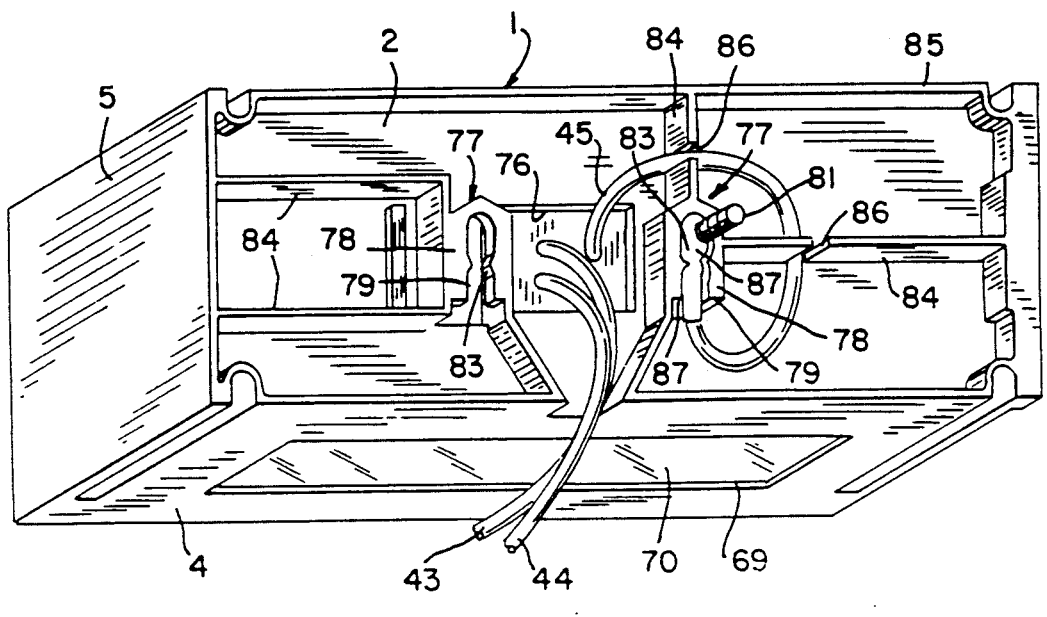

SEALED TAIL LIGHT FOR A BOAT TRAILER

BACKGROUND OF THE INVENTION

One of the problems encountered with boat trailer tail lights is breakage of the light bulbs bulbs are contacted by water during launching the heated of the boat. The bulbs may become heated by the continuous illumination of the bulbs during nighttime trailering, or through frequent operation of the brakes during a launching operation. When the heated bulb is contacted by cold water, the bulb may fracture, thus requiring replacement.

In an attempt to overcome this problem, sealed tail lights have been marketed in which the bulbs are contained within a sealed housing. The seal is accomplished by utilizing a resilient gasket between the lenses and the housing. When the light bulbs of the sealed tail light burn out and need replacement, the replacement is normally done by the boat owner. As a result, many times the sealing gaskets are not properly installed when the lenses are reassembled to the housing. Thus, the sealed characteristics are destroyed, enabling water to enter the housing and contact the bulb.

Another approach to the problem of bulb breakage has been to utilize trailer lights which operate on the air entrapment principle, as disclosed in U.S. Pat. Nos. 3,106,349 and 3,858,039. With tail lights of the type shown in U.S. Pat. No. 3,106,349, the upper end of the housing is sealed, while the lower end of the housing is provided with an opening through which water can enter the housing. As the water rises in the housing during launching of the boat, the air is entrapped in the upper end, preventing the water from rising to a level to contact the bulbs or connections. However, problems have arisen with tail lights of this type. The water within the housing may be jostled as the trailer is moved over uneven terrain during launching, causing the water to splash against the bulbs and the connections. If the bulb is heated, the splashing water may break the bulb, and contact with the connections can cause corrosion.

More recently, boat trailer lights have been constructed utilizing a capsule that is contained within the outer housing, as disclosed in U.S. Pat. No. 4,617,617. In submersible tail lights of this type the bulbs are contained within the transparent capsule and the lower end of the capsule is provided with a hole through which water can enter the capsule; but due to the closed upper end, air will be entrapped in the upper end of the capsule to prevent the water from contacting the bulbs.

SUMMARY OF THE INVENTION

The invention is directed to an improved tail light assembly in which the bulbs are contained within a sealed capsule mounted in the outer housing of the tail light. The sealed capsule includes a base formed of electrically insulating material, such as plastic, which is sealed to a transparent dome-like plastic casing. A tail light and brake bulb, as well as a side marker bulb, are located within the capsule and electrically conducting strips are connected to the bulbs and extend through openings in the base into a well or depression formed in the base. The projecting ends of the conductor strips are attached through connectors to electrical leads and a mass of an electrically non-conductive material, such as resin, is disposed in the well enclosing the openings to the interior of the capsule, as well as encapsulating the connections between the conductor strips and the electrical leads.

With this construction a hermetically sealed capsule is produced, as well as a positive connection between the conductor strips and the electrical leads.

As a feature of the invention, the capsule is mounted in the outer housing without the need of auxiliary connectors or fasteners. In this regard, one end of the base of the capsule is provided with a tongue which is received in a slot in the rear wall of the housing, while the opposite end of the capsule is provided with a lip which terminates in a flange that is captured between the lower edge of the side marker lens and the rear housing wall. With this arrangement, the capsule is firmly secured to the rear wall of the housing, without the need of auxiliary connectors, such as screws or the like.

The bottom wall or surface of the housing can include an opening through which the license plate of the trailer is illuminated and the opening is enclosed by a transparent window. The window is firmly held against the inner surface of the bottom wall housing by a guide mechanism. In this regard, the bottom wall is formed with a pair of inclined guide tracks located on opposite sides of the opening and the ends of the window are provided with guide members which wedgingly engage the guide tracks to hold the window in position. In addition, the edge of the window may be provided with one or more tabs which are engaged within slots in the rear wall of the housing.

The invention also includes a novel mechanism of attachment of the ground wire lead. The rear wall of the housing is provided with an opening through which the electrical leads project and a pair of mounting bolt housings are provided on the rear wall on opposite sides of the opening. Each housing includes an outer surface having an open-ended slot. The head of a mounting bolt is positioned within each housing, with the stem projecting through the slot. A circular connector on the end of the ground lead is positioned on the stem of one of the bolts and is captured between the head of the bolt and the inner surface of the bolt housing. Ribs on the outer surface of the rear wall connect the bolt housing with the peripheral flange and the ribs can be provided with notches which receive the ground lead and retain the lead in a fixed position.

The invention provides an improved sealed submersible tail light for a boat trailer in which a positive seal is provided for the capsule and the electrical lead connections.

The sealed capsule can be firmly attached within the housing without the need of any auxiliary connectors, such as screws or the like.

With the sealed capsule, water is prevented from contacting the bulb or the electrical conductors even though water may enter the outer housing during launching of the boat.

Other objects and advantages will appear during the course of the following description.

DESCRIPTION OF THE DRAWINGS

The drawings illustrate the best mode presently contemplated of carrying out the invention.

In the drawings:

FIG. 1 is a elevational view of the tail light assembly, with parts broken away in section;

FIG. 2 is a horizontal section of the tail light assembly;

FIG. 6 is a perspective view of the outer housing with the lenses and capsule removed;

FIG. 7 is a section taken along line 7-7 of FIG. 6; and

FIG. 8 is a perspective view of the rear wall of the housing showing the attachment of the ground lead to the mounting bolt.

DESCRIPTION OF THE ILLUSTRATED EMBODIMENT

Figure 3:
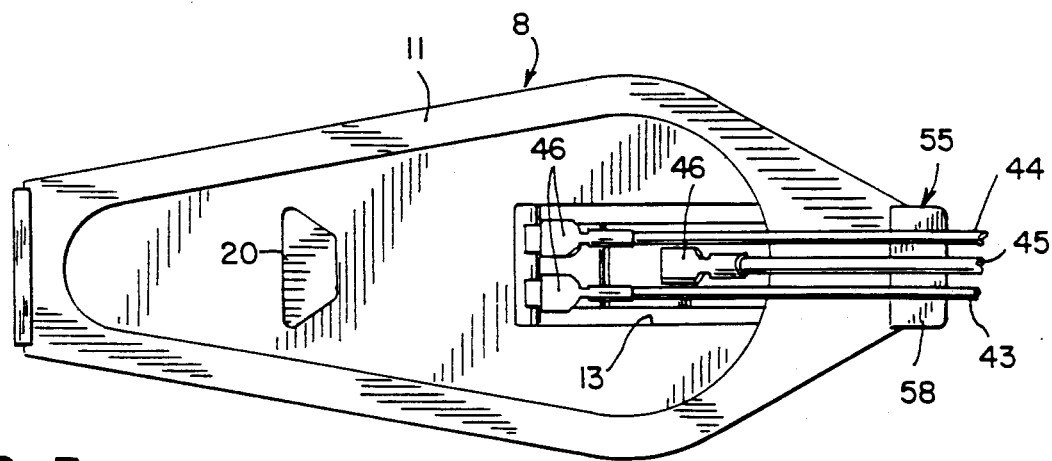
FIG. 3 is a bottom view of the sealed capsule.

The drawings illustrate a sealed tail light assembly for a boat trailer, including a housing 1 composed of a rear wall 2, a top wall 3, a bottom wall 4 and an end wall 5. A tail light and brake lens 6 is mounted on the front of the housing, while a side marker lens 7 is connected to an end of the housing opposite end wall 5.

In the description and claims the terms "front" and "rear" will refer to the tail light assembly itself, and do not refer to its position when mounted on the boat trailer, meaning that when the tail light assembly is mounted on the trailer, the rear wall 2 will be facing forwardly of the trailer.

Contained within the housing 1 is a sealed capsule 8 which contains a pair of light bulbs 9 and 10. Bulb 9 is a tail light and brake bulb, while bulb 10 is a side marker and clearance bulb.

Capsule 8 includes a base 11 formed of plastic or other electrically insulating material and a generally dome-like, transparent casing 12 also formed of a plastic material. The peripheral edge of the casing 12 is sealed to base 11, preferably by ultrasonic welding.

As best shown in FIG. 2, base 11 is formed with a well or depression 13.

The base of bulb 9 is mounted in a socket 14 and the end of the socket is provided with a pair of contacts 15 which are engaged with the metal conductor strips 16 and 17, respectively. The end 18 of strip 16 is secured by staking, indicated by 19, to the end of a boss 20 or projection which extends outwardly from base 11, thus securing the end of strip 16 to the base. Strip 16 also includes an inclined section 22 connected to end section 18 and the inclined section is joined to a section 23 which is generally parallel to section 18. The outer end of section 23 projects through an opening 24 in base 11 and into the well 13.

Figure 4:
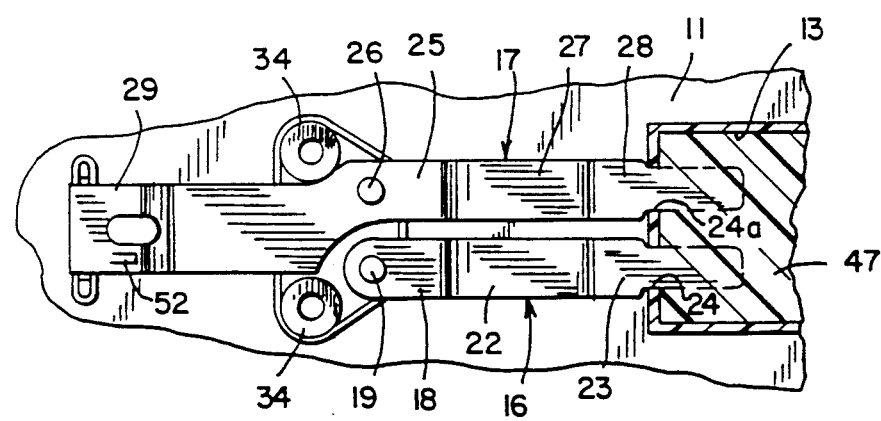
FIG. 4 is a plan view of the bottom of the ground conductor strip.

Conductor strip 17 has a configuration similar to conductor strip 16 and, as best seen in FIG. 4, includes a section 25 which is connected by stake 26 to the boss 20. An incline section 27 is connected to section 25 and incline section 27 terminates in a section which is parallel to section 25. The end of section extends through opening 24a into well 13. The opposite end of section 25 of conductor strip 17 is provided with a flared end 29.

A ground conductor strip 30 is also connected to the bulbs 9 and 10. Ground strip 30 is formed with a central section 32 which is secured by screws 33 to the upper ends of posts 34 that project upwardly from base In addition, strip 30 is provided with an incline section 35 which is connected to section 32 and the incline section is formed with a hole 36 that receives socket 14 of bulb 9.

Incline section 35 of strip 30 is connected to section 37 which is parallel to section 32 and is connected via a stake 38 to the base. A second incline section 39 is connected to section 37, and incline section terminates in an end section 40 which projects through an opening 42 into well 13.

Electrical leads 43, 44 and 45 are connected to the projecting ends of the conductors 23, 28 and 40, respectively, by standard spade type connectors 46. The spade connectors 46 are provided with forked or bifurcated ends which receive the end of the respective conductor strips.

The well 13 containing the connectors 46 is filled with a rigid, electrically insulating material 47, such as a thermosetting resin. In the preferred form of the invention a resin, such as an epoxy resin, can be employed. The resin mass 47 encloses the openings 24 and 2, as well as encapsulating the connectors 46. Thus the resin mass not only seals the capsule, but also provides a positive securement for the electrical conductors to the leads 43-45.

The opposite end of ground strip 30 is provided with a flared extremity 48 which, in combination with the flared extremity 29 of conductor strip 17, defines a socket to receive the base 49 of bulb 10. The construction of the flared ends provides a biasing force to hold or clamp the base 49 of the bulb. Bulb 10 is a standard, wedge-base type in which the bulb contacts are located on the outer surface of the base.

Figure 5:
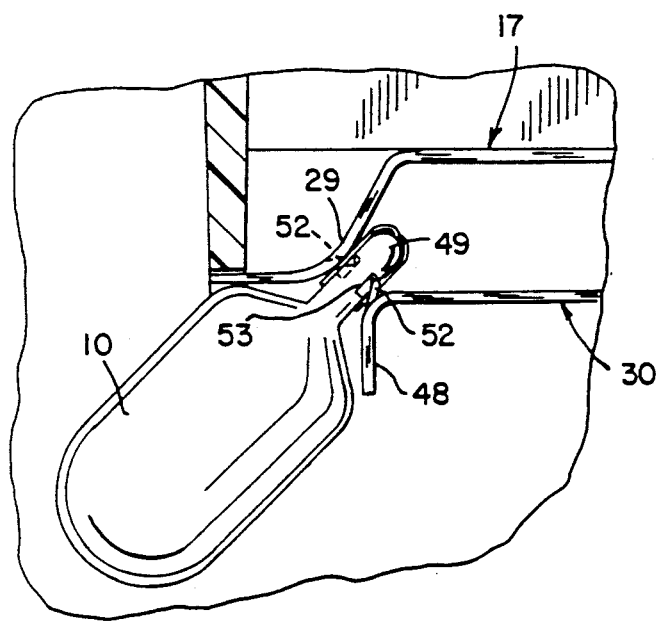
FIG. 5 is an enlarged fragmentary side elevation showing the attachment of the conductor strips to the side marker bulb.

As shown in FIGS. 5 and 1, the flared end 48 is provided with an open-ended slot 50, while both flared ends 29 and 48 are formed with a pair of inwardly projecting barbs or ears 52 which engage the peripheral groove 53 in base 49, thus preventing displacement of the bulb 10 from the socket defined by the ends 29 and 48.

To provide additional stability for bulb 10 a pair of guides 54 extend upwardly from base 11 and are located on either side of the bulb.

To mount capsule 8 within housing 1, one end of base 11 is provided with a tongue 55 which is received within slot 56 in rear wall 2. As best shown in FIG. 2, tongue 55 is provided with an inner section 57 which is disposed generally normal to base 11 and extends through slot 56, and an outer section 58 which is parallel to the base, and is disposed in lapping relation with the outer surface of the rear wall 2.

The opposite end of base 11 is formed with a rearwardly extending lip 59 which terminates in a flange 60 that extends normal to the lip.

The free end of rear wall 2 is formed with a groove 62 which is adapted to receive a pair of spaced tabs 63 formed on the inner edge of side marker lens 7. In addition to groove 62, rear wall 2 is formed with a recess 64 and lip 59 projects through recess 64. Flange 60 is located within the groove 62 and is captured beneath the inner edge of the side marker lens 7. With this construction the ends of the capsule base 11 are firmly connected to the rear wall 2 of the housing, without the need of any auxiliary connectors, such as screws or the like.

Formed in the outer edge of side marker lens 7 is a lip 65 which is located within the peripheral flange 66 on the tail light lens 6, thus providing an interlock between the side marker lens 7 and the tail light lens 6 The lens 6 is secured to the housing 1 by means of a plurality of screws 67 which extend through the lens and are threaded in posts 68 that project outwardly from rear wall 2.

The tail light assembly can also include an opening 69 in the bottom wall 4 through which a license plate on the trailer can be illuminated. Opening 69 is enclosed by a transparent window 70, preferably formed of plastic material, and the window is positioned against the inner surface of the bottom wall 4. Guide tracks 72 are formed on the inner surface of the bottom wall on opposite sides of the opening 69 and the opposite ends of window 70 are provided with guide tabs 73, which are wedgingly received in the guide tracks 72 to firmly position the window against the bottom wall. As shown in FIG. 7, each tab 73 is generally semicircular in shape and contacts the inclined, outer surface of the respective guide track to thereby wedge the window 70 against the bottom wall 4.

In addition, the edge of window 70 facing rear wall 2 can be provided with one or more barbed tabs 4 that are received within slots 75 formed in the rear wall 2 adjacent to bottom wall 4. Engagement of the tabs with the slots provides a further attachment of the window to the housing to prevent displacement of the window and possible rattling.

As illustrated in FIG. 8, the electrical leads 43-45 extend outwardly through an opening 76 in rear wall 2. A pair of mounting bolt housings 77 are provided on rear wall 2 on opposite sides of opening 76. Each housing 77 includes an outer surface 78 having an open-ended slot 79. The head 80 of a mounting bolt 81 is received within each housing 77 with the stem of the bolt extending through the slot 79. Housings 77 can be formed with detents 83 bordering each slot 79. Each bolt 81 is adapted to be press-fitted through the detents 83 into the bottom of the slot and the detents will then prevent displacement of the bolts from the bolt housings 77.

As seen in FIG. 8, a series of ribs 84 connect each bolt housing 77 with the peripheral flange 85 on rear wall 2. The ground lead 45 is received within notches 86 formed in ribs 84, thereby positioning the ground lead with respect to the rear wall. The outer end of ground lead 45 is provided with a generally circular connector 87 which is located around one of the bolts 81 and is captured between the head 80 and the surface 78. This construction provides a convenient manner of connecting the lead 45 to ground and ensures that the lead will be firmly positioned relative to housing to prevent accidental disconnection.

The invention provides an improved, sealed submersible tail light in which the bulbs and the electrical connections are positively sealed within a capsule contained within the outer housing. The invention eliminates the possibility of the heated bulbs being contacted by water, thus preventing breakage of the bulbs.

Various modes of carrying out the invention are contemplated as being within the scope of the following claims particularly pointing out and distinctly claiming the subject matter which is regarded as the invention.

We claim:

1. A tail light assembly, comprising a housing, a sealed capsule disposed in the housing and including a base and a transparent casing, said base having a well therein and having an opening connecting the well with the interior of said casing, an electric bulb disposed within the capsule, electrical conducting means connected to the bulb and having an end extending through said opening and into said well, electrical lead means connected to said end of said electrical conducting means, and a mass of electrically insulating material disposed within the well and encapsulating the connection between said conducting means and said lead means.

2. The assembly of claim 1, in which said conducting means includes a socket to receive said bulb, and a first conductor strip connected to said socket and extending through said opening to said well, said electrical lead means comprising a first lead connected to the outer end of said first conductor strip at a first connection, said mass of material encapsulating said first connection.

3. The assembly of claim 2, wherein said conducting means also includes a second conductor strip connected to said socket and extending through said opening to said well, said electrical lead means including a second electrical lead connected to the end of said second conductor strip at a second joint, said mass of insulating material encapsulating said second connection.

4. The assembly of claim 2, and including biasing means for biasing said first conductor strip into contact with said socket.

5. The assembly of claim 4, wherein said first conductor strip includes a first section secured to said base, a second section disposed at an angle to said first section and engaged with said socket, a third section connected to said second section and engaged with said base, the outer end of the third section being disposed in said well and being coplanar with said first section.

6. The assembly of claim 5, wherein said first and third sections are parallel.

7. The assembly of claim 5, and including a post projecting from said base into said casing, said first section being secured to said post.

8. The assembly of claim 3, wherein said second conductor strip has an opening to receive said socket.

9. The assembly of claim 1, and including a second electrical bulb disposed within said casing, said conducting means being connected to said second bulb.

10. A tail light assembly, comprising an outer housing, a sealed capsule disposed in said housing and including a base and a transparent casing, a well formed in said base and having opening means providing communication between the well and the interior of said casing, first electrical bulb means disposed within the casing, first electrical copnductor means connected to said first bulb means, second bulb means disposed within the casing, second electrical conductor means connected to said second bulb means, third electrical conductor means connected to said first and second bulb means, the ends of said conductor means projecting through said opening means and into said well, a plurality of electrical leads each connected to one of said conductor means with the connections being disposed within said well, and a mass of a rigid resin material disposed within the well and enclosing said opening means and encapsulating said connections.

11. The assembly of claim 10, wherein said connections comprise a spade connector.

12. The assembly of claim 10, wherein said first bulb means comprises a tail light and brake bulb and said second bulb means comprises a side marker clearance light bulb.

13. The assembly of claim 10, wherein said first bulb means includes a socket and a light bulb received within said socket, said first conductor means disposed in engagement with said socket, said third conductor means having an aperture to receive said socket.

14. The assembly of claim 10, wherein the ends of said second and third conductor means define a slot and said second bulb means has an end received within said slot.

15. The assembly of claim 14, wherein said ends defining said slot are biased toward each other to apply a clamping force to the end of said second bulb means.

16. The assembly of claim 15, and including means on one of said ends for preventing displacement of said second bulb means from said slot.

17. The assembly of claim 16, wherein said means for preventing displacement comprises a barb extending into said slot and engaged with the end of said second bulb means.

18. The assembly of claim 13, and including means for biasing said first conductor means into engagement with said socket.

19. The assembly of claim 18, wherein said first conductor means comprises a first section secured to said base and a second section disposed at an angle to said first section and engaged with said socket, said first conductor means also including a third section connected to said second section and engaged with said base, the outer end of said third section projecting through said opening means and into said well, said sections being constructed and arranged to bias said second section into engagement with said socket.

20. A tail light assembly, comprising a housing including a rear wall and having a removable end wall, a sealed capsule disposed within the housing and including a base, a bulb disposed within the capsule, electrical conductor means connected to said bulb and extending to the exterior of said capsule, said rear wall having an aperture, a first portion of said base having a tongue disposed within said aperture and a second portion of said base having a lip engaged with the end of said rear wall, said lip being disposed between the end of said rear wall and the adjacent inner edge of said end wall to provide a connection of said capsule to said rear wall.

21. The assembly of claim 20, wherein said lip includes a first section disposed generally normal to said base and the end of the rear wall has a recess to receive said first section, said lip also including a flange disposed normal to said lip and disposed between the inner edge of said end wall and said end of said rear wall.

22. The assembly of claim 20, wherein the end of the rear wall nas a groove to receive the inner edge of said end wall and said rear wall also includes a recess disposed parallel to and communicating with said groove, said lip also including a flange extending generally normal to said lip, said lip being received within said recess and said flange being disposed between the inner edge of said end wall and the end of said rear. wall.

23. The assembly of claim 20, wherein said tongue includes a first portion extending generally normal to the base and extending through said aperture and a second portion extending parallel to said base and disposed in lapping relation with the outer surface of said rear wall.

24. The assembly of claim 22, wherein said end wall comprises a side marker lens and said housing also includes a tail light lens disposed forwardly of said rear wall, a forward edge of said end wall being provided with a lip engaged with an adjacent edge of said tail light lens.

25. In a tail light assembly, an outer housing to contain a light bulb and having a bottom wall with an opening therein, a transparent window to enclose said opening and disposed against the inner surface of said bottom wall, guide means interconnecting said window with said bottom wall for guiding said window in sliding movement relative to said bottom wall, said guide means comprises a pair of guide tracks each located on opposite sides of said opening with each guide track being bordered by an inclined surface, said guide means also including a pair of guide members disposed at opposite ends of said window and engaged with the respective guide tracks, engagement of each guide member with the inclined surface of the guide track acting to wedge the window against said inner surface.

26. Tail light assembly of cliam 25, wherein the housing includes a rear wall and said rear wall is provided with a slot adjacent said bottom wall, an edge of said window having a tab received within said slot.

27. The tail light assembly of claim 25, wherein said guide members are generally semi-cylindrical in shape and project inwardly of said bottom wall.

28. The tail light assembly of claim 27, wherein said inclined surfaces are spaced from said bottom wall and are engaged by said semi-cylindrical guide members.

* * * * *

UNITED STATES PATENT AND TRADEMARK OFFICE
CERTIFICATE OF CORRECTION

PATENT NO. : 5,060,121
DATED : October 22, 1991
INVENTOR(S) : ALTON J. CUMMINGHAM ET AL It is certified that error appears in the above-identified patent and that said Letters Patent is hereby corrected as shown below:

Col. 6, Line 45, CLAIM 10, Delete "copductor" and substitute therefor --conductor; Col. 8, Line 2, CLAIM 22, Delete "nas" and substitute therefor --has-- ; Col. 8, Line 8, CLAIM 22, Delete "rear." and substitute therefor --rear--; Col. 8, Line 35, CLAIM 26 Delete "cliam" and substitute therefor --claim--

Signed and Sealed this

Eighth Day of June, 1993

Attest:

MICHAEL K. KIRK

*Attesting Officer*   Acting Commissioner of Patents and Trademarks